(12) United States Patent
Tella et al.

(10) Patent No.: US 6,865,321 B2
(45) Date of Patent: Mar. 8, 2005

(54) OPTICAL SYSTEMS AND METHODS USING COUPLING FIXTURES FOR ALIGNING OPTICAL ELEMENTS WITH PLANAR WAVEGUIDES

(75) Inventors: Richard Paul Tella, Sunnyvale, CA (US); William Gong, Sunnyvale, CA (US); Brian Lemoff, Union City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 176 days.

(21) Appl. No.: 10/208,925

(22) Filed: Jul. 31, 2002

(65) Prior Publication Data

US 2004/0022491 A1 Feb. 5, 2004

(51) Int. Cl.[7] ............................... G02B 6/42; G02B 6/32
(52) U.S. Cl. ............................... 385/39; 385/33; 385/52
(58) Field of Search ........................... 385/14, 33–35, 385/39, 49–52, 88–94; 356/399–401

(56) References Cited

U.S. PATENT DOCUMENTS

| | | | | |
|---|---|---|---|---|
| 5,447,585 A | * | 9/1995 | Dannoux et al. | 156/64 |
| 5,812,715 A | * | 9/1998 | Tiemeijer et al. | 385/73 |
| 6,178,188 B1 | * | 1/2001 | Jing et al. | 372/36 |
| 6,456,767 B2 | * | 9/2002 | Terashima | 385/49 |
| 2003/0048994 A1 | * | 3/2003 | Lemoff et al. | 385/52 |

* cited by examiner

Primary Examiner—Rodney Bovernick
Assistant Examiner—Sarah Song

(57) ABSTRACT

The present invention involves the use of coupling fixtures that permit optical elements to be aligned with planar waveguides of planar lightwave circuits. In particular, alignment of the coupling fixtures typically does not require powering of the optical element yet provides a degree of alignment that is comparable to that obtained by active alignment techniques. The alignment process is accompanied by an assembly process that may be performed at relatively high temperatures. This typically makes it possible to use solder for attaching the optical element to the planar lightwave circuit while retaining alignment accuracy. This is advantageous since soldering typically is the preferred choice for assembling components, such as single-mode devices, that require a relatively high degree of alignment precision together with good mechanical rigidity.

15 Claims, 8 Drawing Sheets

OPTICAL SYSTEMS AND METHODS USING COUPLING FIXTURES FOR ALIGNING OPTICAL ELEMENTS WITH PLANAR WAVEGUIDES

FIELD OF THE INVENTION

The present invention is generally related to optics. More particularly, the invention is related to systems and methods for aligning and assembling optical elements with planar lightwave circuits.

DESCRIPTION OF THE RELATED ART

A planar waveguide (PWG) is a part of a planar lightwave circuit (PLC) that is used for guiding a lightwave signal in a predetermined fashion. The lightwave signal is directed into an entry point of the PWG and emerges from one or more destination points of the PWG. As a corollary, a number of lightwave signals may be directed into several entry points of a PWG network located on a PLC and emerge as a combined output from one destination point on the PWG.

A "PLC assembly" is generally defined as a PLC upon which is mounted one or more optical/electro-optical elements coupled to a PWG. Examples of such elements, include an optical fiber, a laser transmitter, and a photodetector module. As is known, when constructing a PLC assembly, it is important to prevent unnecessary signal loss at the coupling junctions where the optical elements are coupled into/out of the PWG. As is also known, various alignment and assembly procedures are used to address this issue.

By way of example, one procedure for actively aligning an optical element to a PWG involves powering-up the element so that it transmits light into the associated PWG. This light passes through a coupling junction formed by the optical element at the entry point of the PWG. At the destination point, an optical signal strength-measuring device is used to measure the amount of received light. The position of the optical element is then adjusted with reference to the PWG until peak signal strength is detected at the measuring device.

This type of alignment is generally carried out in conjunction with an assembly process that involves mechanically anchoring the optical element to the PLC. For instance, a bonding agent, such as epoxy, is used to hold the assembly together for a temporary period of time once optimal positioning has been achieved. When more permanent anchoring is desired, soldering typically is used. Unfortunately, it is generally difficult to apply solder while active alignment is being carried out. This is because the melting point of solder typically exceeds the operating temperature limits for various optical elements, such as laser transmitters and receivers that incorporate electronic components.

An additional handicap related to soldering is encountered when coupling multiple optical elements to a PLC. For example, when multiple lasers have to be coupled to one PLC, thermal conduction through a common substrate places restrictions on the minimum allowable distance separating neighboring lasers. In particular, after a first laser is aligned to a PWG located on a PLC and soldered in place, soldering a second laser associated with a second neighboring PWG may cause heat transfer through the PLC substrate towards the first laser. This heat transfer may melt the solder used to attach the first laser and result in undesired misalignment of the first laser.

It is therefore desirable to provide systems and methods that address these and/or other perceived shortcomings of the prior art.

SUMMARY OF THE INVENTION

The present invention involves the use of coupling fixtures that permit optical elements to be coupled with planar waveguides of planar lightwave circuits. In particular, alignment of the coupling fixtures typically does not require powering of the optical element yet provides a degree of alignment that is comparable to that obtained by active alignment techniques. The alignment process is accompanied by an assembly process that may be performed at relatively high temperatures. This typically makes it possible to use solder for attaching the optical element to the planar lightwave circuit while retaining alignment accuracy. This is advantageous since soldering typically is the preferred choice for assembling components, such as single-mode devices, that require a relatively high degree of alignment precision together with good mechanical rigidity.

The invention also provides benefits related to heat management during the assembly process. More specifically, methods in accordance with the invention can permit multiple optical components to be assembled close to one another. This benefit translates to improved packaging density of optical elements assembled onto planar lightwave circuits.

Clearly, some embodiments of the invention may exhibit advantages in addition to, or in lieu of, those mentioned above. Additionally, other systems, methods, features and/or advantages of the present invention may become apparent to one with skill in the art upon examination of the following drawings and detailed description. It is intended that all such additional systems, methods, features and/or advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
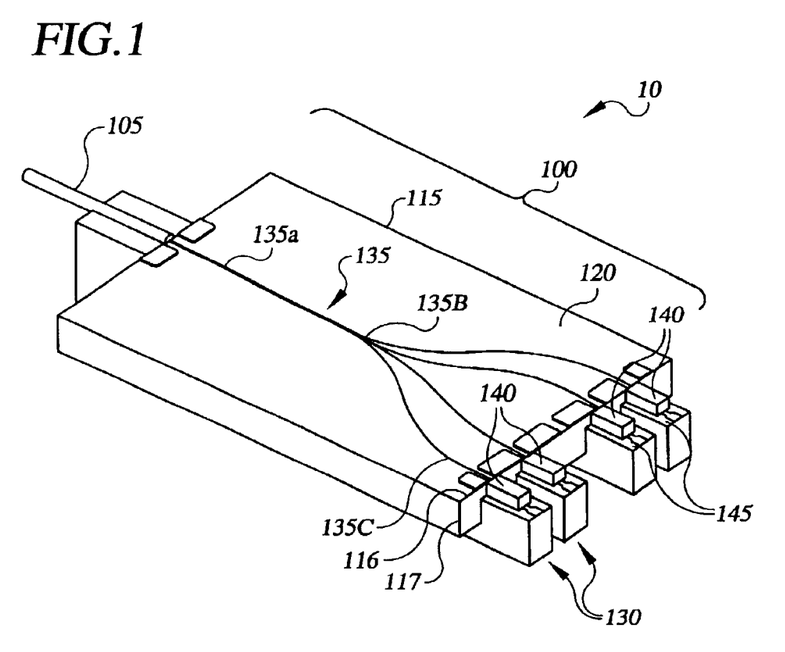
FIG. 1 is a perspective view of an embodiment of a planar lightwave circuit (PLC) assembly in accordance with the present invention.

Referring now to the drawings, an embodiment of an optical system 10 in accordance with the invention will be described in detail with respect to FIGS. 1 and 2. As shown in FIG. 1, optical system 10 includes a PLC assembly 100 that incorporates several edge-emitting lasers 140 mounted on individual coupling fixtures 130.

Each coupling fixture 130 includes at least two surfaces that are substantially parallel to and stepped with respect to each other. In particular, each coupling fixture 130 includes a first surface 145 on which an edge-emitting laser 140 is mounted, and a second surface 160 (shown in FIG. 2) that is used to attach the coupling fixture 130 to the PLC 115.

The stepped surfaces 145, 160 of each of the coupling fixtures 130 help in optimally aligning a laser 140, because the surfaces provide limited freedom of movement of the laser during assembly. Specifically, the surfaces restrict the output of a laser to a direction that is parallel to surface 120 and orthogonal to edges 116 and 117 of the PLC. This is accomplished while permitting movement in a horizontal direction (parallel to edge 116) and a vertical direction (parallel to edge 117). These limitations reduce the possibility of misalignment of the laser 140 with reference to PWG 135c. Such misalignment may occur if the laser 140 were not directed parallel to surface 120.

Note, the assembly shown in FIG. 1 constitutes a 4:1 optical combiner circuit. More specifically, system 10 permits four incident optical signals originated by the four edge-emitting lasers 140 to be combined in the planar waveguide 135 of PLC 115. A combined signal is then routed out of a destination port that is coupled to an optical fiber 105. Also, note that if the four lasers 140 were emitting light at different wavelengths, such a combiner circuit, would be called a "wavelength multiplexer." Clearly, various other types of PLCs and PWGs can be used.

Figure 2:
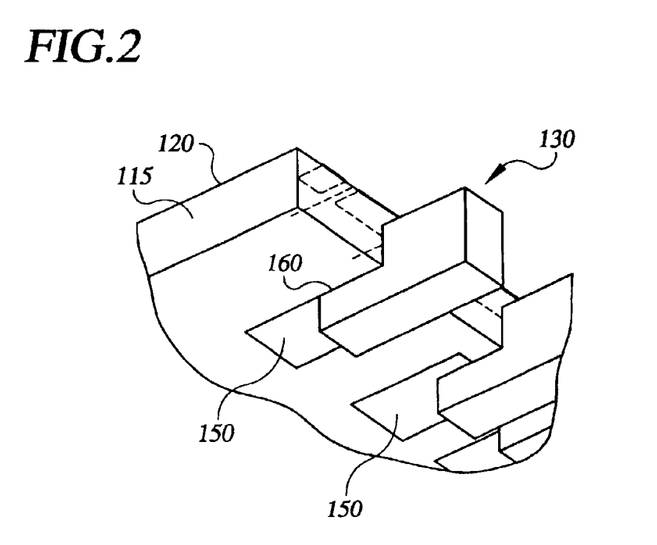
FIG. 2 is a perspective view of a portion of the underside of the PLC assembly of FIG. 1.

FIG. 2 depicts the underside of PLC 115, illustrating in detail the attachment points of the coupling fixtures 130. In particular, surface 160 of each coupling fixture 130 is aligned and attached to a bonding pad 150. Coupling fixture 130 typically is a micro-machined silicon part. However, the coupling fixtures may be constructed from different types of material, not necessarily limited to silicon or silicon-based materials. Such materials may provide certain desirable properties related, for example, to thermal conductivity, electrical conductivity, and mechanical fabrication.

For instance, with respect to thermal characteristics—ceramic may be used in an application that requires thermal isolation during the process of manufacture. Silicon, however, may be preferred in a different application where good thermal conductivity may be desired to carry heat away from an operating device such as a laser.

Various materials also can be used for the PLC 115. One embodiment, for example, uses glass as the substrate for PLC 115 in order to improve thermal insulation between adjacent fixtures 130. This can allow a higher packaging density of coupling fixtures 130 to be incorporated into the PLC assembly 100.

Figure 3:
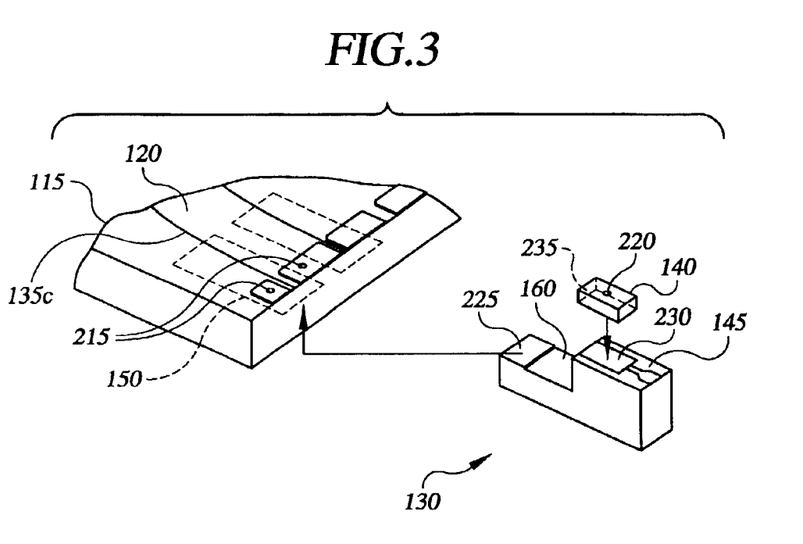
FIG. 3 is a top perspective view of the embodiment of FIG. 1, incorporating an edge-emitting laser.

FIG. 3 illustrates a partially cut-away perspective view of coupling fixture 130 that is used in a butt-coupling method in accordance with the present invention. Butt-coupling can be used when a high degree of optical coupling is not required for a particular application. In particular, an edge-emitting laser 140 (output light emerges from surface 235, hence the term "edge-emitting laser") is mounted to fixture 130 of FIG. 3. The laser projects light into the PWG 135c. PWG 135c carries this projected light into PWG 135a (shown in FIG. 1), which is coupled out via the optical fiber 105 (also shown in FIG. 1).

Coupling fixture 130 includes two solder bonding pads 230 and 225. Pad 230 attaches the laser 140 to coupling fixture 130, and pad 225 attaches fixture 130 to PLC 115. Laser 140 is placed upon fixture 130 using either manual or automated systems (pick-and-place machines, for example), and then attached to pad 230. For example, soldering is the preferred mode of attachment when good mechanical integrity and electrical conductivity are desired. High-temperature solder may be used to solder the laser 140 on to the fixture 130. The placement as well as the soldering process may utilize, for example, industry-wide processes that are known in the art and will not be elaborated further here. Alignment of laser 140 with reference to the fixture 130 is preferably carried out during the soldering process, and a target 220 located on the top surface of laser 140 may be used to perform this alignment.

Producing a PLC assembly by aligning the individual components to one another using a "direct eye-balling" technique is inefficient, and produces low product yields. A generally preferred alternative involves an operator or an automated system using elements such as cameras, height sensors, and an auxiliary illumination system, to carry out the alignment and assembly process.

The alignment and assembly process to attach the laser-mounted fixture 130 to the PLC 115 is typically executed using a lower temperature solder which is heated to permit it to melt while simultaneously adjusting the fixture 130 with reference to the PLC 115. Targets 215 and 220 are utilized as registration targets for carrying out this alignment. The use of lower temperature solder during this part of the assembly process minimizes movement and reflow of the higher temperature solder joint between the laser 140 and fixture 130.

Figure 4:
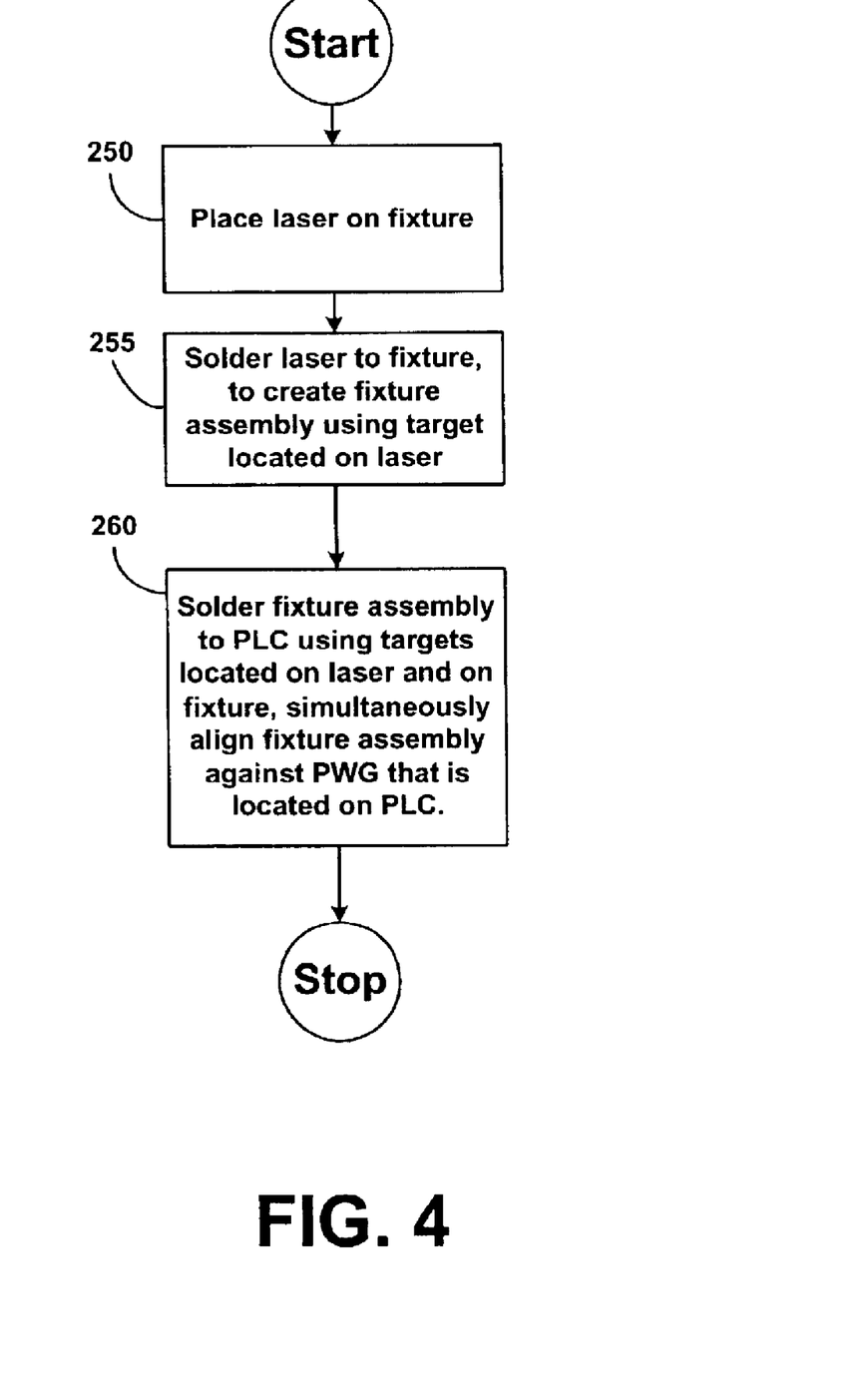
FIG. 4 is a flow chart depicting an embodiment of a method in accordance with the present invention.

FIG. 4 is a flow chart of a method of assembling the system of FIG. 3. It will be appreciated that, although particular example process steps are described, alternative implementations are feasible. Moreover, steps may be executed out of order from that shown or discussed, including substantially concurrently or in reverse order, depending on the functionality involved. The description should not be construed as a limiting parameter for the invention's various implementations in other applications.

The first step 250 involves placing the optical element, which in this case is an edge-emitting laser, upon the coupling fixture. The laser is then bonded to the fixture in step 255 using one of several techniques such as epoxy bonding or high temperature soldering. Alignment between edge-emitting laser and the coupling fixture is facilitated by a target 220 that is located upon the top surface of the laser. Step 250 is carried out independent of the PLC, and is desirable, because it does not involve applying heat to the PLC. This is unlike existing processes that involve soldering the laser directly on to the PLC and can disturb other lasers that may have been already installed at adjacent locations on the PLC.

In step 260, this fixture assembly is soldered to the PLC, using a low temperature solder. During the soldering process, when the solder is in a melted state, the fixture assembly is suitably adjusted so as to provide optimal optical alignment with the PWG that is located on the PLC. Targets 215 and 220 (FIG. 3) are used to carry out this optical alignment. Step 260 may be carried out using elements such as cameras, position sensors and auxiliary illumination systems.

Figure 5:
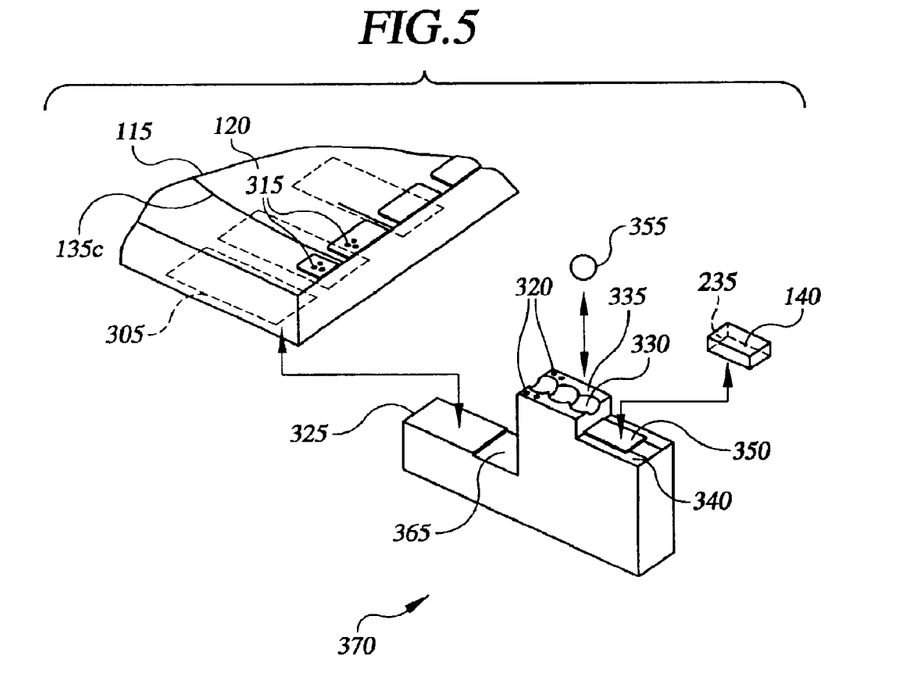
FIG. 5 is a top perspective view of an alternative embodiment of a coupling fixture in accordance with the present invention.

FIG. 5 is a perspective view of a coupling fixture 370, which is an alternative embodiment of the coupling fixture 130. While coupling fixture 130 has two surfaces that are substantially parallel to and stepped with respect to each other, coupling fixture 370 includes three surfaces that are substantially parallel to and stepped with respect to each other. In particular, coupling fixture 370 includes a first surface 340 on which an edge-emitting laser 140 is mounted, a second surface 365 that is used to attach the coupling fixture 370 to the PLC 115, and a third surface 335 on which is mounted a ball lens 355. Because the ball lens is used to provide a high degree of optical coupling between the laser 140 and the corresponding PWG 135c located on the PLC 115, a higher precision alignment technique is used.

During the first step of the assembly process, laser 140 is placed on solder pad 350 and soldered in place. The second step of the assembly process involves registering the ball lens 355 with and anchoring the ball lens in a receptacle 330. This anchoring process may involve several methods, including epoxy bonding, wire bonding, or a wire clip.

Once the ball lens is anchored, coupling fixture 370 and the attached ball lens are positioned so that the laser 140, the ball lens 355, and the PWG 135c of PLC 115 are axially aligned with each other. Positioning is carried out using support devices such as vacuum-assisted clamps. Laser 140 is then powered-up and a light-measuring device is connected to a destination port (for example, to the fiber 105 of FIG. 1). Coupling fixture 370 is manipulated until the light-measuring device indicates maximum signal strength. This process is typically carried out using techniques such as a hill-climbing algorithm that is known to people of ordinary skill in the art.

An auxiliary camera and illumination system is used to image coupling fixture 370 together with PLC 115, and record positional coordinates associated with the alignment position corresponding to the maximum signal strength. The auxiliary illumination system, may be used in conjunction with other elements such as a camera and a co-ordinate recording apparatus. The alignment process typically uses specialized markings, referred to as registration targets, that are marked on objects such as the coupling fixture 370, and the PLC 115.

A first registration target located on coupling fixture 370 is implemented by the use of fiducials 320, while a second registration target located on PLC 115 is implemented by fiducials 315. While the example described here shows the registration targets located on the top surface 335, these targets may be located on other surfaces (vertical, bottom, etc) as may be desired for carrying out alignment along other axes. The coordinate mapping mechanism is used to record the coordinates of fiducials 320 and fiducials 315 to provide a relative-positioning relationship between coupling fixture 370 and PLC 115 when they are aligned to provide maximum optical coupling.

The third step of the assembly process, involves powering-down the laser 140, applying solder, and coupling fixture 370 onto PLC 115. This is carried out by heating the mount coupling fixture 370 and applying solder to pad 325. Pad 305 on PLC 115 is then brought into contact with the molten solder on pad 325 such that the solder flows between the pads. While the solder is molten the parts are aligned to the coordinates that were recorded earlier during active alignment. Once this is done, the coupled assembly is allowed to cool to solidify the solder.

The alignment process described above is termed a "quasi-active" alignment process. This is because the final alignment/assembly uses a "passive" (laser powered-down) alignment process that incorporates pre-determined coordinates obtained using an "active" (laser powered-up) alignment procedure.

Figure 6:
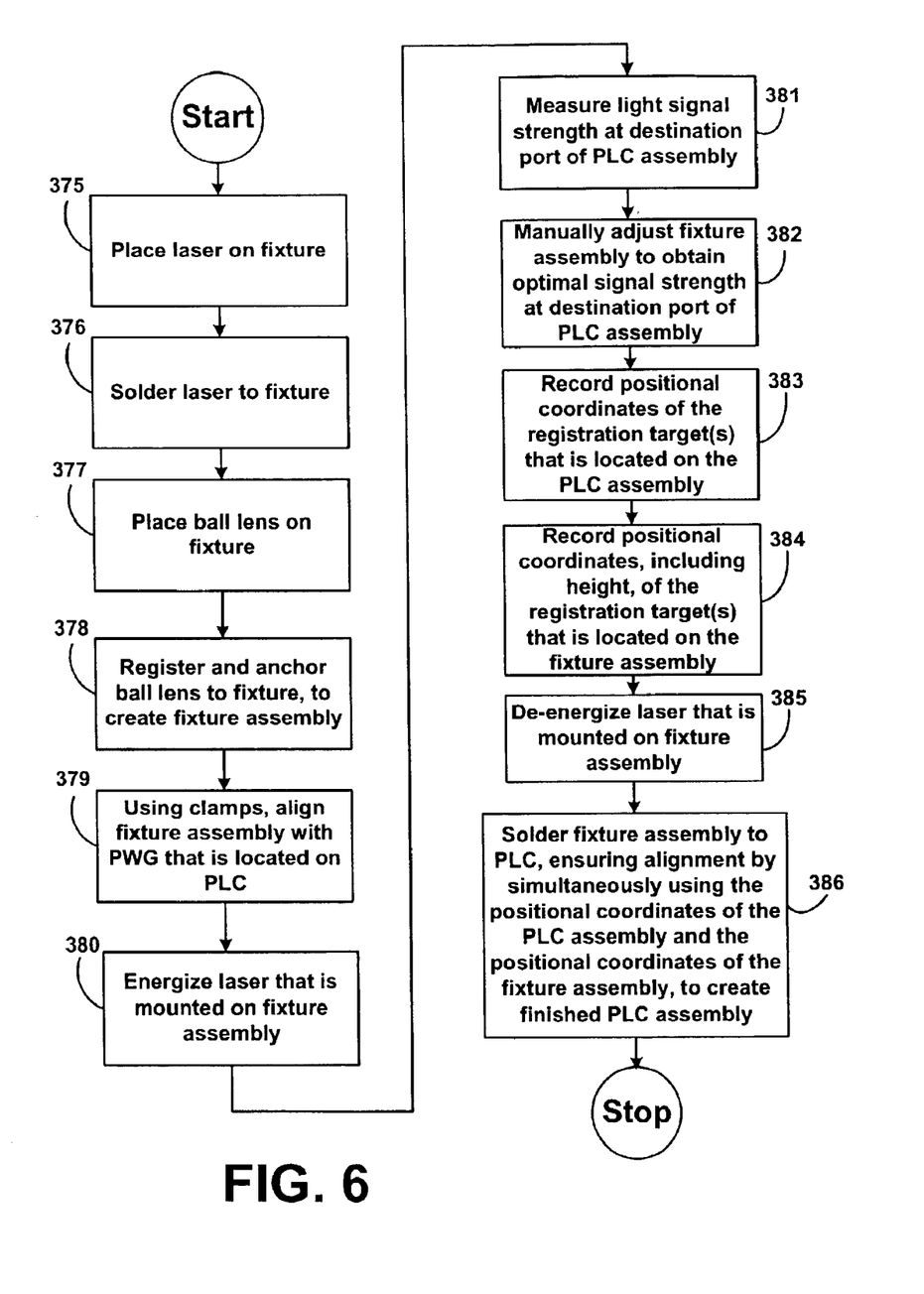
FIG. 6 is a flow chart of an alternative embodiment of a method in accordance with the present invention.

FIG. 6 is a flow chart of a method for assembling the system of FIG. 5 utilizing a quasi-active alignment technique. While this flow chart is applicable to several optical elements, the system of FIG. 5 (which incorporates a ball element in addition to the optical element) is used as an example system, because it incorporates additional steps that may be needed to accommodate the ball lens.

The first step 375 of this method involves placing the laser, while the second step 376 indicates attaching the laser to the fixture. The procedures for steps 375 and 376 are similar to those described earlier with reference to steps 250 and 255 of FIG.4. After these two steps have been performed, the ball lens is placed in the receptacle of the fixture (step 377). The ball lens is then "registered" and anchored in step 378. The anchoring mechanism is designed to withstand the elevated temperatures that may be encountered in subsequent steps. This mechanism may include soldered joints, epoxy, wire bonding, retaining clips, and/or clamps.

At this stage a fixture assembly has been created by having integrated the laser and the ball lens into the coupling fixture. The fixture assembly is then aligned with the PWG located in the PLC (step 379) and held in place using "temporary" holding mechanisms such as vacuum clamps and mounting fixtures.

In step 380, the laser is energized by applying power to the laser unit. The resulting light signal is directed through the PWG and is available at a destination port of the PLC. An optical signal-measuring system that is attached to this destination port is used to measure the signal strength of the laser light (step 381). Using automated or manual techniques, the fixture assembly is then manipulated (step 382) to obtain optimal signal strength at the measuring system.

In step 383, a recording system is used to record the positional coordinates of a registration target located on the PLC assembly. This registration target may include a fiducial, while the positional coordinates may include X-axis, Y-axis, and Z-axis parameters.

A similar recording is carried out in step 384 for a second registration target that is located on the fixture assembly. The two sets of recordings, one for the PLC, and one for the fixture assembly, provide positional information related to the coupling of one to the other. This information has been obtained using an "active" alignment process, because the laser is in an energized state at this time.

In step 385, the laser is de-energized. The subsequent step 386 involves attaching the fixture assembly in a long-term fashion (soldering, for example). A "passive" alignment process is used, in step 386, while the fixture assembly is soldered in place onto the PLC. The positional information obtained during the active alignment is used to carry out this passive alignment, leading to the term "quasi-active" alignment.

Figure 7:
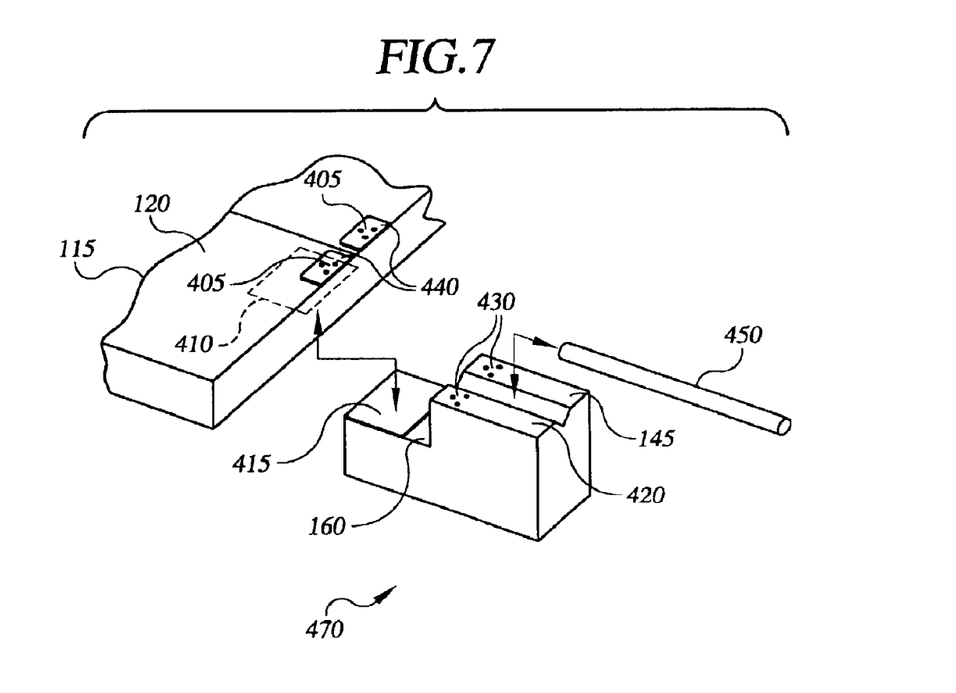
FIG. 7 is a perspective view of a second alternative embodiment of the coupling fixture in accordance with the present invention.

FIG. 7 is a perspective view of a coupling fixture 470, which is yet another alternative embodiment of the coupling fixture 130. An optical fiber 450 is located in a V-groove 420. The V-groove 420 can be created by conventional wet etch processing of the fixture 470, and provides the accuracy required to produce a coupling junction with sub-micron alignment accuracy.

Similar to the registration targets described earlier with reference to FIG. 5, PLC 115 includes a first set of registration targets embodied by fiducials 405, while fixture 470 includes a second set of registration targets, embodied by fiducials 430. The assembly process associated with FIG. 7 uses the quasi-active alignment method described earlier. As an exemplar application, this assembly process is further described in FIGS. 8 and 9, using an extension of the quasi-active alignment concept to encompass a repetitive process of assembly, such as is applicable to a production line.

Figure 8:
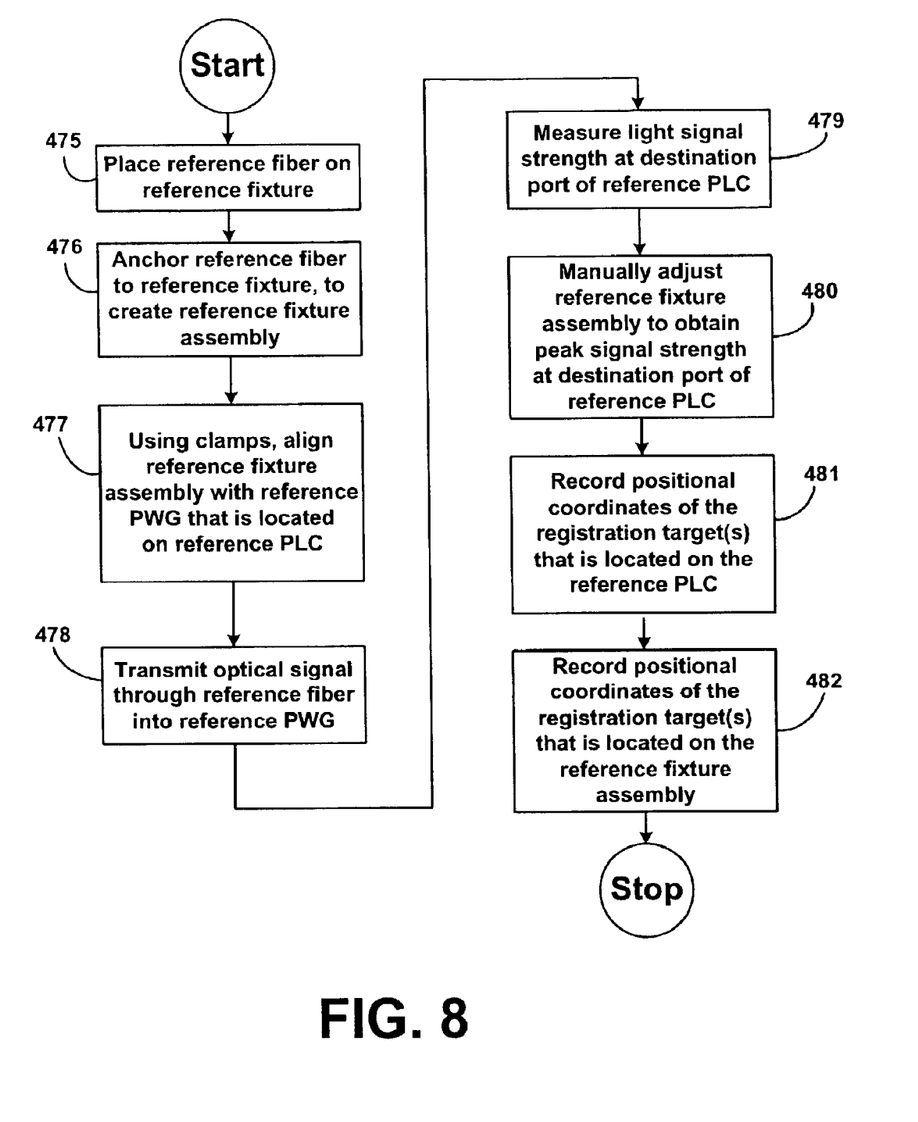
FIG. 8 is a flow chart of a second alternative embodiment of a method in accordance with the present invention.

FIG. 8 is a flow chart of a method for obtaining positional information using an active alignment technique upon a "reference" system. The method is described using an optical fiber as an optical element, but it will be apparent to one of ordinary skill in the art that the method described may be equally applicable to other types of elements. This method is only applicable when the multiple PLC assemblies are comprised of individual parts that have been mass manufactured as a single batch, thereby creating parts that are significantly identical to one another. The identical nature of these parts allows repetitive alignment procedures to be applied using a set of measurements that have been obtained from a single "reference" setup.

In step 475, a "reference" fiber, which is substantially identical to a fiber that is intended to be installed onto a coupling fixture, is placed into a "reference" coupling fixture. This "reference" coupling fixture is substantially identical to a coupling fixture to be installed onto a PLC assembly.

The reference fiber is anchored to the reference fixture to create a reference fixture assembly, in step 476. Anchoring is carried out using techniques such as clamping with a suitable "lid" assembly, epoxy, solder, and/or mechanical clamps. The reference fixture assembly is then aligned with the PWG that is located on the reference PLC. This is carried out in step 477, and is implemented in a manner similar to that described earlier in step 379 of FIG. 6.

Light is then transmitted through the fiber into the PWG (step 478) by attaching a light source to the free end (pig tail) of the fiber. Steps 479, 480, 481, and 482 substantially replicate the active alignment steps that were described earlier in steps 381, 383, 383, and 384 of FIG. 6.

Once the positional coordinates of the registration targets on the reference PLC and the targets on the reference fixture assembly have been obtained, the method of FIG. 8 is terminated. It is not necessary at this stage to solder the reference fixture to the reference PLC, because the goal of this method is to obtain "reference" information that will be used subsequently in an application that uses the method of FIG. 8.

Figure 9:
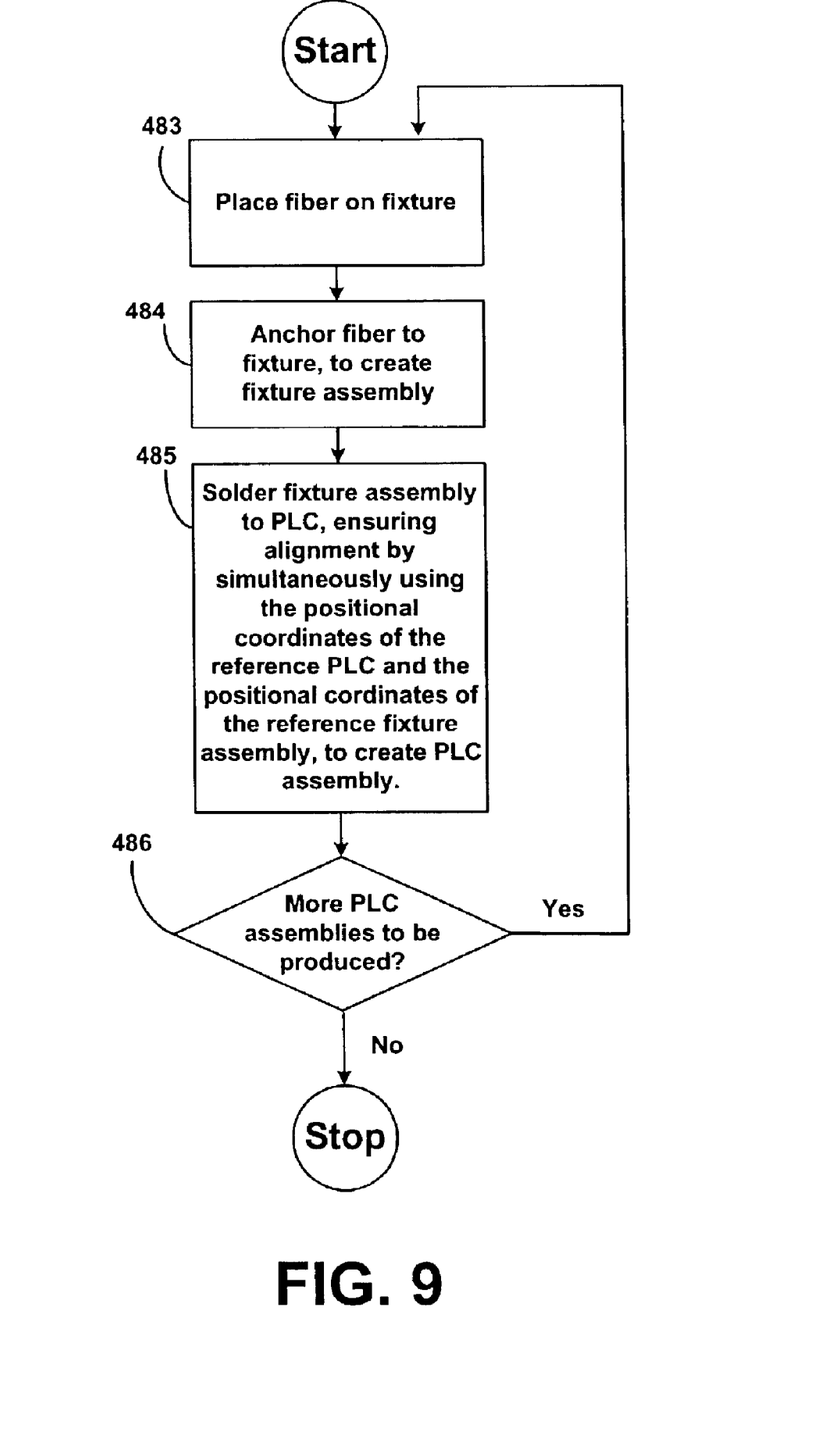
FIG. 9 is a flow chart of an alignment process that relates to the flow chart of FIG. 8.

FIG. 9 is a flow chart of a method that uses the positional information obtained in FIG. 8 to implement a quasi-active alignment process to produce multiple PLC assemblies such as in a production environment. In step 483, a fiber is placed on a fixture. This fiber is then anchored onto the fixture, as described earlier in step 476 of FIG. 8. Step 485 utilizes the positional information obtained via the method of FIG. 8 to passively align the fixture to a PWG located in a PLC. As this positional information was obtained using an active alignment process, the method of FIG. 9 accomplishes a quasi-active alignment process. Step 486 is used to determine if the production cycle of steps 483, 484, and 485 should be repeated for producing more PLC assemblies.

It should be emphasized that the above-described embodiments of the present invention are merely possible examples of implementations, and are merely set forth for a clear understanding of the principles of the invention. Many variations and modifications may be made to the above-described embodiment(s) of the invention without departing substantially from the spirit and principles of the invention. All such modifications and variations are included herein within the scope of this disclosure and the present invention and protected by the following claims.

What is claimed is:

1. An optical system comprising:
    a planar lightwave circuit (PLC) having an exterior surface and a first planar waveguide (PWG);
    a first coupling fixture attached to said PLC, said first coupling fixture having a first top surface, a second top surface stepped down from and parallel to said first top surface, and a side surface having a first edge shared with said first top surface and a second edge shared with said second top surface; and
    a first optical element attached to said first top surface,
    said second top surface being affixed to said exterior surface of said PLC such that said first optical element is optically coupled to said PWG.

2. The optical system of claim 1, wherein said coupling fixture includes a first optical registration target element arranged for aligning said first optical element with said PWG.

3. The optical system of claim 2, wherein said PLC includes a second optical registration target element arranged for aligning said coupling fixture with said PLC.

4. The optical system of claim 1, wherein the first optical element is an optical transmitter.

5. The optical system of claim 1, wherein the first optical element is an optical receiver.

6. The optical system of claim 1, wherein said PLC comprises a second PWG adjacent to the first PWG; and further comprising:
    a second coupling fixture attached to said PLC; and
    a second optical element attached to said second coupling fixture;
    wherein said second coupling fixture is affixed to said PLC such that said second optical element is optically coupled to said second PWG.

7. The optical system of claim 6, wherein said second coupling fixture has a primary top surface and a secondary top surface stepped down from and parallel to said primary top surface, and a side surface having a first edge shared with said primary top surface and a second edge shared with said secondary top surface;
    wherein said second optical element is attached to said primary top surface; and
    wherein said secondary top surface is affixed to said exterior surface of said PLC.

8. A coupling fixture for assembling a first optical element, said coupling fixture comprising:
    a first top surface;
    a first attaching element located on said first top surface to attach the first optical element to said first top surface;
    a second top surface stepped down from said first top surface;
    a side surface having a first edge shared with said first top surface and a second edge shared with said second top surface; and
    a second attaching element located on said second top surface such that, when said second attaching element is used to affix said second top surface to a bottom surface of a PLC, said first optical element optically couples to a PWG of the PLC.

9. The coupling fixture of claim 8, wherein said first top surface defines a first receptacle sized and shaped to receive at least a portion of the optical element.

10. The coupling fixture of claim 8, wherein said first attaching element is a bonding pad.

11. The coupling fixture of claim 8, further comprising:
   a third top surface stepped up from and parallel to said first top surface;
   said third top surface defines a second receptacle sized and shaped to receive a second optical element, such that when so received, said second optical element is optically coupled to said first optical element.

12. The coupling fixture of claim 11, wherein said second receptacle is sized and shaped to receive at least a portion of a ball lens.

13. The coupling fixture of claim 8, wherein the first attaching element comprises a solder pad and a high-temperature solder, and the second attaching element comprises a solder pad and a low-temperature solder.

14. The coupling fixture of claim 13, further comprising:
   an optical registration target for aligning said first optical element with said PWG.

15. An optical system comprising:
   a planar lightwave circuit (PLC) having a bottom surface, a side surface, a first planar waveguide (PWG), and a second PWG;
   a first coupling fixture having a first top surface, a second top surface, and a side surface, wherein said second top surface is stepped down from and parallel to said first top surface, and wherein said side surface includes a first edge that is shared with said first top surface and a second edge that is shared with said second top surface;
   a first optical element attached to said first top surface of said first coupling fixture, said second top surface of said first coupling fixture being affixed to said bottom surface of said PLC such that said first coupling fixture is substantially butted against said side surface of said PLC, and said first optical element is optically coupled to said first PWG;
   a second coupling fixture having a first top surface, a second top surface, and a side surface, wherein said second top surface is stepped down from and parallel to said first top surface, and wherein said side surface includes a first edge that is shared with said first top surface and a second edge that is shared with said second top surface; and
   a second optical element attached to said first top surface of said second coupling fixture, said second top surface of said second coupling fixture being affixed to said bottom surface of said PLC such that said second coupling fixture is located alongside said first coupling fixture, substantially butted against said side surface of said PLC, wherefore said side surface of said first coupling fixture is positioned parallel to said side surface of said second coupling fixture and said second optical element is optically coupled to said second PWG.

* * * * *